United States Patent
Dafniotis et al.

(10) Patent No.: US 12,195,585 B2
(45) Date of Patent: Jan. 14, 2025

(54) COPOLYETHERESTER RESIN FORMULATION

(71) Applicant: Celanese Polymers Holding, Inc., Wilmington, DE (US)

(72) Inventors: Petros Dafniotis, Geneva (CH); Yann Gradelet, Chambery (FR)

(73) Assignee: Celanese Polymers Holding, Inc., Wilmington, DE (US)

( * ) Notice: Subject to any disclaimer, the term of this patent is extended or adjusted under 35 U.S.C. 154(b) by 868 days.

(21) Appl. No.: 17/271,904

(22) PCT Filed: Aug. 30, 2019

(86) PCT No.: PCT/US2019/049072
§ 371 (c)(1),
(2) Date: Feb. 26, 2021

(87) PCT Pub. No.: WO2020/047415
PCT Pub. Date: Mar. 5, 2020

(65) Prior Publication Data
US 2021/0317261 A1    Oct. 14, 2021

Related U.S. Application Data

(60) Provisional application No. 62/725,501, filed on Aug. 31, 2018.

(51) Int. Cl.
| C08G 63/66 | (2006.01) |
| C08G 63/183 | (2006.01) |
| C08L 33/12 | (2006.01) |
| C08L 83/04 | (2006.01) |

(52) U.S. Cl.
CPC .......... *C08G 63/66* (2013.01); *C08G 63/183* (2013.01); *C08L 33/12* (2013.01); *C08L 83/04* (2013.01)

(58) Field of Classification Search
CPC ....... C08G 63/66; C08G 63/183; C08L 33/12; C08L 83/04
USPC ........................................................ 528/300
See application file for complete search history.

(56) References Cited

U.S. PATENT DOCUMENTS

| 5,733,986 A | 3/1998 | Senda et al. |
| 8,129,471 B2 | 3/2012 | Chakravarti |

FOREIGN PATENT DOCUMENTS

| JP | H0937802 A | * | 2/1997 |
| JP | 2002147489 A | * | 5/2002 |
| JP | 2006-249163 A | | 9/2006 |
| JP | 2017-145399 A | | 8/2017 |
| WO | 2018/019614 A1 | | 2/2018 |

OTHER PUBLICATIONS

International Search Report and Written Opinion in International Application No. PCT/US2019/049072, issued Nov. 12, 2019.
Japanese Office Action for Japanese Patent Appln. No. 2021-510423 mailed on Aug. 31, 2023, 7 pages.

* cited by examiner

*Primary Examiner* — Ling Siu Choi
*Assistant Examiner* — Ronald Grinsted
(74) *Attorney, Agent, or Firm* — Dority & Manning, P.A.

(57) ABSTRACT

Provided herein is a copolyetherester resin formulation that is suitable for the manufacture of CVJ boots showing reduced squeak. Further provided are CVJ boots comprising the copolyetherester resin formulation.

13 Claims, 2 Drawing Sheets

COPOLYETHERESTER RESIN FORMULATION

CROSS-REFERENCES TO RELATED APPLICATIONS

This application claims priority under 35 U.S.C. §§ 365 and 371 to International Application No. PCT/US2019/049072, filed on Aug. 30, 2019, which in turn claims priority to U.S. Provisional Appln. No. 62/725,501, filed on Aug. 31, 2018, each of which is incorporated herein by reference in its entirety.

FIELD OF INVENTION

The present invention relates to the field of copolyetherester resin formulations, particularly copolyetherester formulations for non-squeak constant-velocity joint (CVJ) boots.

BACKGROUND OF THE INVENTION

Constant-velocity joints (also known as homokinetic or CV joints) allow a drive shaft to transmit power through a variable angle, at constant rotational speed, without an appreciable increase in friction or play. They are mainly used in front wheel drive vehicles, and many modern rear wheel drive cars with independent rear suspension typically use CV joints at the ends of the rear axle halfshafts and increasingly use them on the drive shafts.

Constant-velocity joints are protected by a rubber boot, or CVJ boot, usually filled with molybdenum disulfide grease. The CVJ boot is a ribbed, elastomeric flexible boot that keeps water and dirt out of the joint and the special grease inside the joint. Clamps are used to secure the boot to the axle and the joint and prevent grease from leaking out.

CVJ boots are typically made from thermoplastic elastomer, in particular copolyetheresters. Copolyetheresters have the desired mechanical and physical properties, good chemical resistance to grease, and permit the use of blow moulding to manufacture the CVJ boot.

A common problem in outboard CVJ boots is that under high angle between the driveshaft and the joint (typically ≥40°, α in FIG. 1), low rotation speeds (typically ≤200 rpm), and in a wet environment, the boots can emit a high frequency sound (referred to as "squeak") often at such a high pitch that it creates discomfort for both the car occupants as well as pedestrians. This is a well-known problem for the past 20 years or more but has become even more pronounced as a result of recent developments:
- A lot of attention and progress has focused on NVH (Noise Vibration Harshness) issues in vehicles by almost all manufacturers hence car interiors are quieter, making the squeak more noticeable;
- Car engines have become increasingly quiet;
- Electric vehicles and Hybrid vehicles at low rotation speeds are very quiet, hence the squeak is more noticeable;
- CVJ boots become thinner, hence there is less noise absorption possible;
- Consumers are asking for faster maneuvering in parking zones, hence the requirements for larger angles of rotation are ever increasing.

To combat this squeak noise generation, thermoplastic elastomeric resin producers have added one or more waxes to their formulations. For example, International Application WO 2018/019614 A1 discloses the use of slow and fast diffusing waxes to counter this problem.

There is a need for elastomeric resin formulations for the manufacture of CVJ boots that decrease squeak.

SUMMARY OF THE INVENTION

In a first aspect, provided herein is a copolyetherester formulation comprising:
(1) at least one copolyetherester resin; and
(2) a polysiloxane at an amount that gives a concentration of Si at the surface by Energy Dispersive X-ray spectroscopy of greater than 0.5 wt %; and
(3) a polyether glycol wax at a concentration of greater than 1 wt %;
wherein all weight percentages (wt %) are based on the total weight of the formulation.

In a second aspect, provided herein is a CVJ boot made from a copolyetherester formulation that comprises:
(1) at least one copolyetherester resin; and
(2) a polysiloxane at an amount that gives a concentration of Si at the surface by Energy Dispersive X-ray spectroscopy of greater than 0.5 wt %; and
(3) a polyether glycol wax at a concentration of greater than 1 wt %; wherein all weight percentages (wt %) are based on the total weight of the formulation.

DETAILED DESCRIPTION OF THE INVENTION

Figure 1:
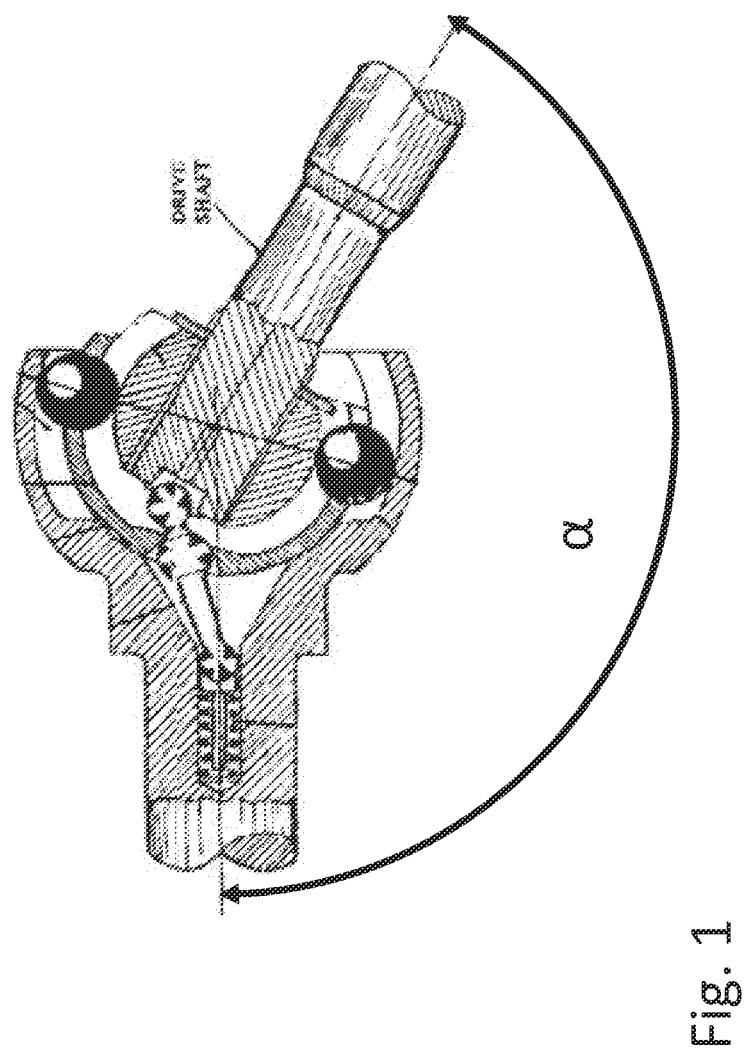
FIG. 1 shows a schematic view in partial cross-section of a CV joint and its connection to the drive shaft. The angle α is the angle at which the rotation of the joint occurs during testing of the CVJ boot.

The inventors have surprisingly found that when a copolyetherester formulated with a polysiloxane and a polyether glycol wax is used to make CVJ boots, the resulting boots show excellent non-squeak performance.

Definitions

Molecular weights of polymers as reported herein are reported in Daltons (DA) as number or weight average molecular weights, as determined by size exclusion chromatography (SEC).

Copolyetherester

The one or more copolyetheresters suitable for use in the formulations described herein are preferably present in an amount from at or about 80 to at or about 95 weight percent, the weight percentage being based on the total weight of the formulation. The weight percentages are complementary, that is, the sum of the weight percentages of all the components in the formulations described herein is 100 wt %.

Copolyetheresters used in the formulation of the present invention have a multiplicity of recurring long-chain ester units and short-chain ester units joined head-to-tail through ester linkages, said long-chain ester units being represented by formula (A):

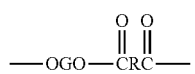

(A)

and said short-chain ester units being represented by formula (B):

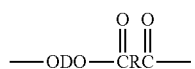

(B)

wherein
G is a divalent radical remaining after the removal of terminal hydroxyl groups from poly(alkylene oxide)glycols having a number average molecular weight of between about 400 and about 6000, or preferably between about 400 and about 3000;
R is a divalent radical remaining after removal of carboxyl groups from a dicarboxylic acid having a molecular weight of less than about 300;
D is a divalent radical remaining after removal of hydroxyl groups from a diol having a molecular weight less than about 250.

As used herein, the term "long-chain ester units" as applied to units in a polymer chain refers to the reaction product of a long-chain glycol with a dicarboxylic acid. Suitable long-chain glycols are poly(alkylene oxide) glycols having terminal (or as nearly terminal as possible) hydroxy groups and having a number average molecular weight of from about 400 to about 6000, and preferably from about 600 to about 3000. Preferred poly(alkylene oxide) glycols include poly(tetramethylene oxide) glycol, poly(trimethylene oxide) glycol, poly(propylene oxide) glycol, poly(ethylene oxide) glycol, copolymer glycols of these alkylene oxides, and block copolymers such as ethylene oxide-capped poly(propylene oxide) glycol. Mixtures of two or more of these glycols can be used.

As used herein, the term "short-chain ester units" as applied to units in a polymer chain of the copolyetheresters refers to low molecular weight compounds or polymer chain units having molecular weights less than about 550. They are made by reacting a low molecular weight diol or a mixture of diols (molecular weight below about 250) with a dicarboxylic acid to form ester units represented by Formula (B) above.

Included among the low molecular weight diols which react to form short-chain ester units suitable for use for preparing copolyetheresters are acyclic, alicyclic and aromatic dihydroxy compounds. Preferred compounds are diols with about 2-15 carbon atoms such as ethylene, propylene, isobutylene, tetramethylene, 1,4-pentamethylene, 2,2-dimethyltrimethylene, hexamethylene and decamethylene glycols, dihydroxycyclohexane, cyclohexane dimethanol, resorcinol, hydroquinone, 1,5-dihydroxynaphthalene, and the like. Especially preferred diols are aliphatic diols containing 2-8 carbon atoms, and a more preferred diol is 1,4-butanediol. Included among the bisphenols which can be used are bis(p-hydroxy)diphenyl, bis(p-hydroxyphenyl) methane, and bis(p-hydroxyphenyl)propane. Equivalent ester-forming derivatives of diols are also useful (e.g., ethylene oxide or ethylene carbonate can be used in place of ethylene glycol or resorcinol diacetate can be used in place of resorcinol).

As used herein, the term "diols" includes equivalent ester-forming derivatives such as those mentioned. However, any molecular weight requirements refer to the corresponding diols, not their derivatives.

Dicarboxylic acids that can react with the foregoing long-chain glycols and low molecular weight diols to produce the copolyetheresters are aliphatic, cycloaliphatic or aromatic dicarboxylic acids of a low molecular weight, i.e., having a molecular weight of less than about 300. The term "dicarboxylic acids" as used herein includes functional equivalents of dicarboxylic acids that have two carboxyl functional groups that perform substantially like dicarboxylic acids in reaction with glycols and diols in forming copolyetherester polymers. These equivalents include esters and ester-forming derivatives such as acid halides and anhydrides. The molecular weight requirement pertains to the acid and not to its equivalent ester or ester-forming derivative.

Thus, an ester of a dicarboxylic acid having a molecular weight greater than 300 or a functional equivalent of a dicarboxylic acid having a molecular weight greater than 300 are included provided the corresponding acid has a molecular weight below about 300. The dicarboxylic acids can contain any substituent groups or combinations that do not substantially interfere with copolyetherester polymer formation and use of the copolyetherester polymer in the formulations of the invention.

As used herein, the term "aliphatic dicarboxylic acids" refers to carboxylic acids having two carboxyl groups each attached to a saturated carbon atom. If the carbon atom to which the carboxyl group is attached is saturated and is in a ring, the acid is cycloaliphatic. Aliphatic or cycloaliphatic acids having conjugated unsaturation often cannot be used because of homopolymerization. However, some unsaturated acids, such as maleic acid, can be used.

As used herein, the term "aromatic dicarboxylic acids" refer to dicarboxylic acids having two carboxyl groups each attached to a carbon atom in a carbocyclic aromatic ring structure. It is not necessary that both functional carboxyl groups be attached to the same aromatic ring and where more than one ring is present, they can be joined by aliphatic or aromatic divalent radicals or divalent radicals such as —O— or —SO2—.

Representative useful aliphatic and cycloaliphatic acids that can be used include sebacic acid; 1,3-cyclohexane dicarboxylic acid; 1,4-cyclohexane dicarboxylic acid; adipic acid; glutaric acid; 4-cyclohexane-1,2-dicarboxylic acid; 2-ethylsuberic acid; cyclopentanedicarboxylic acid, decahydro-1,5-naphthylene dicarboxylic acid; 4,4'-bicyclohexyl dicarboxylic acid; decahydro-2,6-naphthylene dicarboxylic acid; 4,4'-methylenebis(cyclohexyl) carboxylic acid; and 3,4-furan dicarboxylic acid. Preferred acids are cyclohexane dicarboxylic acids and adipic acid.

Representative aromatic dicarboxylic acids include phthalic, terephthalic and isophthalic acids; bibenzoic acid; substituted dicarboxy compounds with two benzene nuclei such as bis(p-carboxyphenyl)methane; p-oxy-1,5-naphthalene dicarboxylic acid; 2,6-naphthalene dicarboxylic acid; 2,7-naphthalene dicarboxylic acid; 4,4'-sulfonyl dibenzoic acid and C1-C12 alkyl and ring substitution derivatives thereof, such as halo, alkoxy, and aryl derivatives. Hydroxy acids such as p-(beta-hydroxyethoxy)benzoic acid can also be used provided an aromatic dicarboxylic acid is also used.

Aromatic dicarboxylic acids are a preferred class for preparing the copolyetherester elastomers useful for this invention. Among the aromatic acids, those with 8-16 carbon atoms are preferred, particularly terephthalic acid alone or with a mixture of phthalic and/or isophthalic acids. The copolyetherester elastomer preferably comprises from at or about 15 to at or about 99 weight percent short-chain ester units corresponding to Formula (B) above, the remainder being long-chain ester units corresponding to Formula (A) above. More preferably, the copolyetherester elastomers comprise from at or about 20 to at or about 95 weight percent, and even more preferably from at or about 50 to at or about 90 weight percent short-chain ester units, where the remainder is long-chain ester units. More preferably, at least about 70% of the groups represented by R in Formulae (A) and (B) above are 1,4-phenylene radicals and at least about 70% of the groups represented by D in Formula (B) above are 1,4-butylene radicals and the sum of the percentages of R groups which are not 1,4-phenylene radicals and D groups that are not 1,4-butylene radicals does not exceed 30%. If a second dicarboxylic acid is used to prepare the copolyetherester, isophthalic acid is preferred and if a second low molecular weight diol is used, ethylene glycol, 1,3-propanediol, cyclohexanedimethanol, or hexamethylene glycol are preferred. When used in connection with copolyetheresters, the weight percentages of the copolymerized residues, such as long- and short-chain esters, aliphatic radicals, and dicarboxylic acids, are based on the total weight of the copolyetherester. Moreover, the weight percentages are complementary, that is, the sum of the weight percentages of all the copolymerized units in the copolyetheresters is 100 wt %.

A blend or mixture of two or more copolyetherester elastomers can be used. The copolyetherester elastomers used in the blend need not on an individual basis come within the values disclosed hereinbefore for the elastomers. However, the blend of two or more copolyetherester elastomers must conform to the values described herein for the copolyetheresters on a weighted average basis. For example, in a mixture that contains equal amounts of two copolyetherester elastomers, one copolyetherester elastomer can contain 60 weight percent short-chain ester units and the other resin can contain 30 weight percent short-chain ester units for a weighted average of 45 weight percent short-chain ester units.

Preferred copolyetherester elastomers include, but are not limited to, copolyetherester elastomers prepared from monomers comprising
(1) poly(tetramethylene oxide) glycol; (2) a dicarboxylic acid selected from isophthalic acid, terephthalic acid and mixtures thereof; and (3) a diol selected from 1,4-butanediol, 1,3-propanediol and mixtures thereof, or from monomers comprising (1) poly(trimethylene oxide) glycol; (2) a dicarboxylic acid selected from isophthalic acid, terephthalic acid and mixtures thereof; and (3) a diol selected from 1,4-butanediol, 1,3-propanediol and mixtures thereof, or from monomers comprising (1) ethylene oxide-capped poly(propylene oxide) glycol; (2) a dicarboxylic acid selected from isophthalic acid, terephthalic acid and mixtures thereof; and (3) a diol selected from 1,4-butanediol, 1,3-propanediol and mixtures thereof.

Preferably, the copolyetherester elastomers described herein are prepared from esters or mixtures of esters of terephthalic acid and/or isophthalic acid, 1,4-butanediol and poly(tetramethylene ether)glycol or poly(trimethylene ether) glycol or ethylene oxide-capped polypropylene oxide glycol, or are prepared from esters of terephthalic acid, e.g. dimethylterephthalate, 1,4-butanediol and poly(ethylene oxide)glycol. More preferably, the copolyetheresters are prepared from esters of terephthalic acid, e.g., dimethylterephthalate, 1,4-butanediol and poly(tetramethylene ether)glycol. In a preferred embodiment, the formulations according to the present invention comprise copolyetherester elastomers prepared from monomers comprising (1) poly(tetramethylene oxide) glycol or poly(trimethylene oxide) glycol and mixtures thereof; (2) a dicarboxylic acid selected from the group consisting of isophthalic acid, terephthalic acid and mixtures thereof; and (3) a diol selected from the group consisting of 1,4-butanediol, 1,3-propanediol and mixtures thereof.

More preferably, the formulations according to the present invention comprise copolyetherester elastomers prepared from monomers comprising (1) poly(tetramethylene oxide) glycol; (2) a dicarboxylic acid selected from the group consisting of terephthalic acid; and (3) a diol selected from the group consisting of 1,4-butanediol, 1,3-propanediol and mixtures thereof and wherein the level of poly(tetramethylene oxide) glycol is less than about 25 weight percent based on the total weight of the copolyetherester elastomers.

In another embodiment, the formulations according to the present invention comprise a blend of at least one copolyetherester elastomer prepared from monomers comprising (1) poly(tetramethylene oxide) glycol; (2) a dicarboxylic acid selected from the group consisting of terephthalic acid; and (3) a diol selected from the group consisting of 1,4-butanediol, 1,3-propanediol and mixtures thereof and wherein the level of poly(tetramethylene oxide) glycol is less than about 25 weight percent based on the total weight of the copolyetherester elastomers, and of at least one copolyetherester thermoplastic elastomer prepared from monomers comprising (1) poly(tetramethylene oxide) glycol; (2) a dicarboxylic acid selected from the group consisting of mixtures of isophthalic acid and terephthalic acid; and (3) a diol selected from the group consisting of 1,4-butanediol, 1,3-propanediol and mixtures thereof and wherein the level of said copolyetherester elastomer is from about 5 to about 50 weight percent based on the total weight of the copolyetherester elastomers.

The copolyetheresters preferably have a number average molecular weight of between 50,000 and 100000, more particularly preferably between 60,000 and 75,000.

Particularly preferred are copolyetheresters prepared from the monomers terephthalate, poly(tetramethylene oxide) glycol and butane diol. Even more preferred are such copolyetheresters having the following characteristics: 50-60 wt % terephthalate, 35-45 wt % poly(tetramethylene oxide) and 15-25 wt % 1,4-butanediol.

Polysiloxane

Preferred polysiloxanes for use in the formulation of the invention have in general the chemical formula $[R_2SiO]_n$, where R is an organic group such as an alkyl (methyl, ethyl) or phenyl group. Particularly preferred is polydimethylsiloxane (PDMS).

Preferably the polysiloxane has a molecular weight higher than 500,000, more preferably higher than 600,000.

The formulations of the invention, when pelleted or shaped into CVJ boots, have a concentration of Si at the surface of greater than 0.5 wt % as measured by Energy Dispersive X-ray spectroscopy (EDX), based on the weight of atoms in the surface layer, using a surface layer depth of 1.5 microns.

In order to achieve a surface concentration of Si, as measured by EDX, of greater than 0.5 wt %, it is preferred to incorporate the polysiloxane into the copolyetherester by various methods:

Encapsulation of the polysiloxane, for example using poly[methyl(meth) acrylate];

Preblending of the polysiloxane, for example with polyolefins, such as a copolymer of ethylene and (meth) acrylate, or with a copolyetherester;

Reacting the polysiloxane with a compatibiliser, such as reacting the polysiloxane with a copolymer of ethylene and (meth)acrylate.

In a preferred embodiment, the polysiloxane is PDMS is formulated by being encapsulated in poly[methyl(meth) acrylate]. Particularly preferably the encapsulated polysiloxane has an average particle size, as determined by optical microscopy of 200-250 µm. Such products are commercially available, for example METABLEN-S(Mitsubishi Chemical Corporation).

Particularly preferred formulated polysiloxanes are the following:

(A) A reaction product of a copolymer of ethylene and (meth)acrylate (preferably at 40 wt %, based on the total weight of the reaction product), and polydimethylsiloxane (PDMS) (preferably at 60 wt %, based on the total weight of the reaction product).

(B) PDMS encapsulated in poly[methyl (meth)acrylate], preferably having a particle size of 1000 µm, for example METABLEN S-2100 from Mitsubishi Chemical Corporation.

(C) PDMS encapsulated in poly[methyl (meth)acrylate], preferably having a particle size of 250 µm, for example METABLEN SX-005 from Mitsubishi Chemical Corporation.

The polysiloxane is used at an amount that yields a surface concentration of Si of greater than 0.5 wt %, more preferably greater than 0.7 wt %, as determined by EDX. More preferably the surface Si concentration is between 0.7-2 wt %, more particularly preferably between 0.9-1.5 wt %, even more particularly preferably at 1 wt %.

Assuming that the wt % Si in the bulk will be approximately the same as the wt % Si at the surface, the amount of polysiloxane to be added to give a surface concentration of Si of greater than 0.5 wt % can be estimated as follows:

$$[\text{wt\% formulated polysiloxane to be added}] > \frac{0.5 \text{ wt\%}}{[\text{fraction } Si \text{ in formulated polysiloxane}]}$$

Typical amounts of polysiloxane added to the formulation to yield the above surface Si concentrations are 1 to 10 wt %, more preferably 3-5 wt %, based on the total weight of the complete copolyetherester formulation.

For example, when polysiloxane (C) is used, it is preferably added at 2-6 wt %, more preferably 3-5 wt % based on the total weight of the copolyetherester formulation.

Polyether Glycol Wax

The polyether glycol wax is preferably selected from those polyether glycols having repeat glycol units of 2, 3 or 4 carbon atoms. Poly(tetramethylene oxide) glycol (PTMEG) is particularly preferred.

The polyether glycol preferably has a molecular weight of from 800 to 3,000, more preferably from 1,000-2,500, particularly preferably 2,000.

A preferred polyether glycol is poly(tetramethylene oxide) glycol having a molecular weight of from 800 to 3,000, more preferably from 1,000-2,500, particularly preferably 2,000.

The polyether glycol wax is preferably used in an amount greater than 1 wt %, more preferably greater than 1.5 wt %, based on the total weight of the copolyetherester formulation. Preferably it is present in an amount of from 1.5 to 4 wt %, more preferably between 2 to 3.5 wt %, particularly preferably about 3 wt %, based on the total weight of the copolyetherester formulation.

In a particularly preferred embodiment, the polyether glycol wax is PTMEG, preferably having a molecular weight of 2000, and it is used at an amount of 1 to 6 wt %, preferably 2-5 wt %, based on the total weight of the copolyetherester formulation.

Additional Ingredients

The copolyetherester formulations described herein may further comprise additives that include, but are not limited to, one or more of the following components as well as combinations of these: metal deactivators, such as hydrazine and hydrazide; heat stabilizers; antioxidants; modifiers; colorants, lubricants, fillers and reinforcing agents, impact modifiers, flow enhancing additives, antistatic agents, crystallization promoting agents, conductive additives, viscosity modifiers, nucleating agents, plasticizers, mold release agents, scratch and mar modifiers, drip suppressants, adhesion modifiers and other processing aids known in the polymer compounding art. Preferably, the additives are selected from the group consisting of stabilizers, processing agents, metal deactivators, antioxidants, UV stabilizers, heat stabilizers, dyes and/or pigments. When used, additional additives are preferably present in amounts of about 0.05 to about 10 weight percent, based on the total weight of the copolyetherester formulation.

The copolyetherester formulations described herein are melt-mixed blends, wherein all of the polymeric components are well-dispersed within each other and all of the non-polymeric ingredients are well-dispersed in and bound by the polymer matrix, such that the blend forms a unified whole. Any melt-mixing method may be used to combine the polymeric components and non-polymeric ingredients of the present invention.

The polymeric components and non-polymeric ingredients of the copolyetherester formulations of the invention may be added to a melt mixer, such as, for example, a single or twin-screw extruder; a blender; a single or twin-screw kneader; or a Banbury mixer, either simultaneously through a single step addition, or in a stepwise fashion, and then melt-mixed. When adding the polymeric components and non-polymeric ingredients in a stepwise fashion, a portion of the polymeric components and/or non-polymeric ingredients are first added and melt-mixed with the remaining polymeric components and non-polymeric ingredients being subsequently added and further melt-mixed until a well-mixed composition is obtained.

CVJ Boot

A CVJ boot of the invention is made using the copolyetherester formulation of the invention by any technology for shaping polymers. Particularly suitable are injection moulding, press blow molding, and extrusion and injection blow moulding. Particularly preferred is press blow molding.

Figure 2:
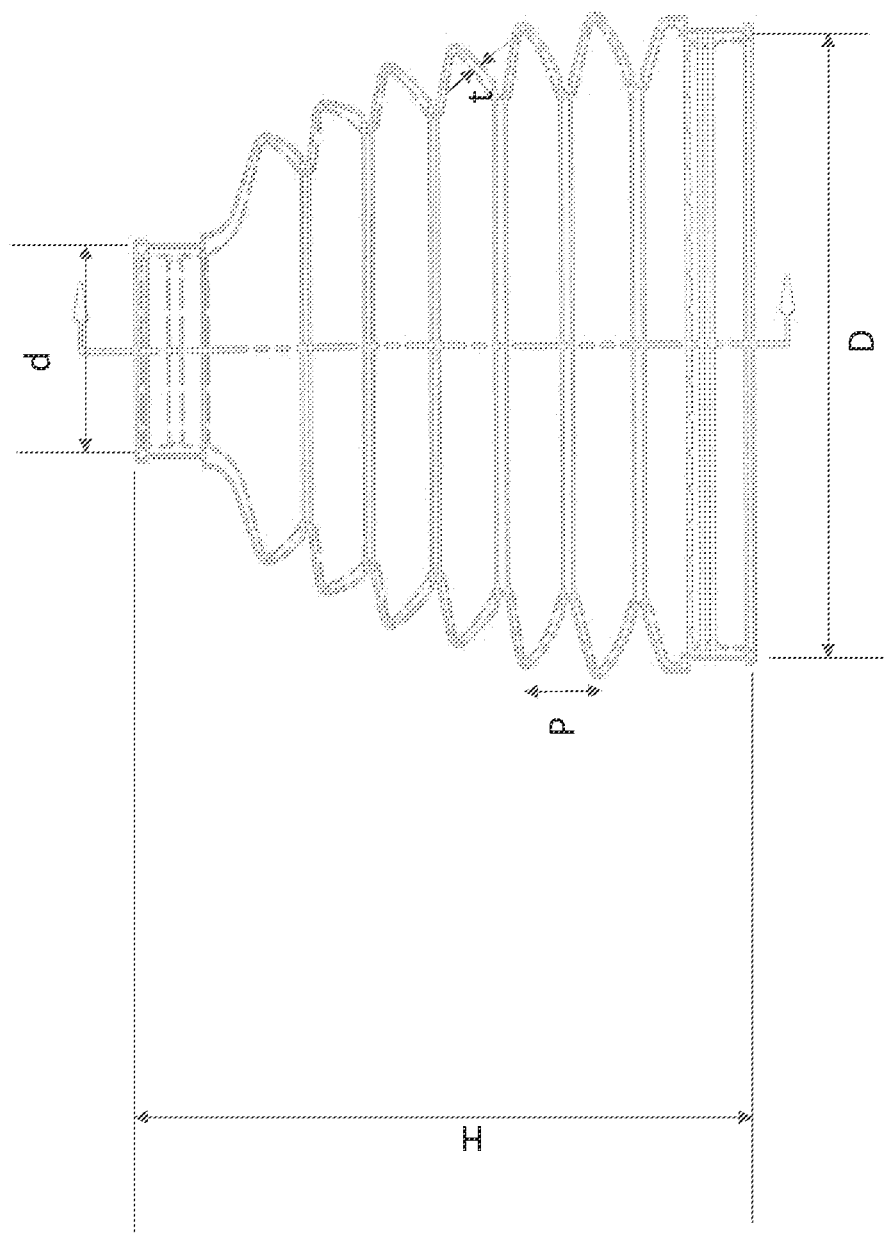
FIG. 2 shows a schematic axial cross-section of a CVJ boot. H designates the height, D the largest diameter, d the smallest diameter, t the wall thickness, and P the pitch (axial distance between peaks).

Referring now to the drawings, wherein like reference numerals designate corresponding structure throughout the views, and referring in particular to FIG. 2, the dimensions of the CVJ boot are chosen for the size and dimensions of the vehicle. Some typical dimensions for use in a passenger car are the following:

Height 60 to 120 mm;
Pitch 9 to 18 mm;
Number of bellows 5 to 7;
Wall thickness 0.9 to 1.3 mm;
Max. Diameter 100 mm;
Min. diameter 25 mm In a particularly preferred embodiment, the CVJ boot has 7 bellows, thickness ~1.1 mm, height 115-120 mm, weight ~75 g.

Squeak Performance

CVJ boots made with the copolyetherester formulations of the invention preferably show a squeak-free run time of greater than 35 cycles. By "squeak-free" is meant producing noise under 78 dB(A) for two consecutive cycles.

Set-up of squeak performance measurement:
1. An angle of 40° between the driveshaft and the joint ($\alpha$ in FIG. 1) and a rotational speed of 150 rpm, the boot is filled with grease, for example based on mineral oil and having paraffinic mineral type oil (75-85 wt %), polyurea type thickener (~5-15 wt %), as well as the usual set of grease modifiers for: friction [typically molybdenum disulfide ($MoS_2$), or molybdenum dibutyldithiocarbamate (MoDTC)], rust protection, abrasion inhibitor (typically zinc dithiophosphate—ZnDTP) and antioxidant. Grease is typically applied as ~70 g in the joint and ~50 g in the boot interior surface;
2. Typical experimental protocol: cycle of 100 seconds, application of liquid and solids uniformly to the exterior of the boot during rotation:
   a) 30 s spray of liquid (30 ml)
   b) 10 s addition of solids (10 g)
   c) 60 s just rotation
3. The liquid is water or an aqueous solution of antifreeze chemicals consisting of 15 wt % calcium chloride, 15 wt % calcium hydroxide, and 70 wt % tap water. This formulation is designed to reproduce conditions found on roads in cold and dry climates.
4. The solids are sand, preferably from 0.1-1.2 mm average diameter.
5. Pressure is measured using for example with a microphone (such as a National Instruments GRAS ½" Free-Field Response Microphone) placed at an appropriate distance from the boot (for example 14 cm from the boot), preferably pointed directly at the boot bellows, and is converted to dB(A), preferably time averaged over one boot rotation (e.g. at 150 rpm, this is 0.4 seconds).
6. A squeak noise is declared and the experiment is stopped when a noise level of 78 dB(A) is measured for 2 consecutive cycles. The number of cycles up to this point is recorded as "Number of cycles before squeak".

Preferably CVJ boots made with the copolyetherester formulations of the invention show a squeak-free run time of at least 35 cycles or at least 40 cycles, more preferably at least 50 cycles, particularly preferably at least 70 cycles.

The following examples are provided to describe the invention in further detail. These examples, which set forth a preferred mode presently contemplated for carrying out the invention, are intended to illustrate and not to limit the invention.

EXAMPLES

Resin Formulations

Resin formulations were compounded by melt blending a salt-and-pepper blend of the components in a twin-screw extruder. The compounded melt blended mixtures of comparative examples and of all examples were extruded in the form of laces or strands, cooled in a water bath, chopped into granules and placed in sealed aluminum lined bags in order to prevent moisture pick-up.

The copolyetherester used had PBT hard segments and polytetramethylene oxide soft segments. Specifically, 44 wt % was polytetramethylene oxide soft segment and 63 wt % was the hard segment made by the transesterification reaction of dimethyl-terephthalate and 1,4-butanediol.

The following three types of formulated polysiloxanes were used:
A: A reaction product of 40 wt % of a copolymer of ethylene and (meth)acrylate, and 60 wt % polydimethylpolysiloxane (PDMS)
B: PDMS encapsulated in poly[methyl (meth)acrylate], having a particle size of 1000 μm. (METABLEN S-2100, Mitsubishi Chemical Corporation)
C: PDMS encapsulated in poly[methyl (meth)acrylate], having a particle size of 250 μm. (METABLEN SX-005, Mitsubishi Chemical Corporation)
D: PDMS encapsulated in aromatic TPU with ester type soft blocks
E: PDMS encapsulated in acrylic rubber modified aliphatic-ester-ester TPU incorporating a styrene elastomer (SEBS) as a coupling agent
F: PDMS encapsulated in EMA (Ethylene MethAcrylate) resin The polyether wax used was a PTMEG having an average molecular weight of 2000.

CVJ Boots

CVJ boots were made from the various resin formulations by press blow moulding, for example, using an Ossberger DSE150 pressblower machine. The CVJ boots had the following dimensions:
7 bellows
Wall thickness ~1.1 mm
Height 115-120 mm
Weight ~75 g Squeak Testing The squeak testing rig allows a defined rotational speed and angle to be applied. The majority of the experimental work used an angle of 40° between the driveshaft and the joint and a rotational speed of 150 rpm.

The boot and the joint were filled with grease based on mineral oil and having paraffinic mineral type oil (75-85 wt %), polyurea type thickener (~5-15 wt %), as well as the usual set of grease modifiers for: friction [typically molybdenum disulfide ($MoS_2$), or molybdenum dibutyldithiocarbamate (MoDTC)], rust protection, abrasion inhibitor (typically zinc dithiophosphate—ZnDTP) and antioxidant. Grease was applied as ~70 g in the joint and ~50 g in the boot interior surface.

The system after an initial warm up of ten minutes at 150 rpm underwent a series of cycles as follows:

Experimental protocol: cycle of 100 seconds, application of liquid and solids uniformly to the exterior of the boot during rotation
  a) 30 s spray of liquid (30 ml)
  b) 10 s addition of solids (10 g)
  c) 60 s just rotation The liquid used was water or an aqueous solution of antifreeze chemicals 15 wt % calcium chloride, 15 wt % calcium hydroxide, and 70 wt % tap water. This formulation is designed to reproduce conditions found on roads in cold and dry climates.

A variety of solids was used, such as sand having dimensions of approximately 0.8-1.0 mm. Sand having and average particle diameter of ~0.5 mm was also tested with similar results. Many different types and origins of natural sand were used with little to no difference.

After 60 seconds of rotating the CVJ with grease, liquid, and abrasive inside the boot, the noise was measured using a microphone (National Instruments GRAS ½" Free-Field Response Microphone) placed 14 cm from the boot, pointed directly at the boot bellows, and was converted to dB(A), time averaged over one boot rotation (e.g. at 150 rpm, this is 0.4 seconds) and converted to dB(A). A squeak noise was declared and the experiment stopped when a noise level of 78 dB(A) was measured for 2 consecutive cycles. The number of cycles up to this point was recorded as "Number of cycles before squeak", not counting the last two consecutive cycles.

Results

The results of squeak testing for the various resin formulations are listed in Table 1.

TABLE 1

Squeak-free run time for CVJ boots made with copolyetherester containing different polysiloxanes and PTMEG

| Resin | Formulated polysiloxane Type | Amount used wt % | Si % wt by EDX (surface) | PTMEG with MW ~2000 wt % | # cycles before squeak |
|---|---|---|---|---|---|
| C1 | None | 0.00% | 0.00% | 3.50% | 4 |
| C2 | A | 3.00% | 0.34% | 0.00% | 2 |
| C3 | B | 5.00% | 0.12% | 0.00% | 2 |
| C4 | B | 2.50% | 0.08% | 0.00% | 2 |
| C5 | C | 2.50% | 0.71% | 0.00% | 2 |
| C6 | C | 4.00% | 1.20% | 0.00% | 2 |
| C7 | B | 5.00% | 0.24% | 2.00% | 2 |
| E1 | C | 4.00% | 1.18% | 3.00% | 92* |
| E2 | C | 2.00% | 1.10% | 2.00% | 50* |
| E3 | C | 5.00% | 1.15% | 3.00% | 40* |
| C11 | D | 4.00% | 0.40% | 3.00% | 25 |
| C8 | D | 7.00% | 0.50% | 0.00% | 2 |
| E5 | E | 7.00% | 0.59% | 3.00% | 35 |
| C9 | E | 7.00% | 0.49% | 0.00% | 2 |
| E6 | F | 4.00% | 0.65% | 3.00% | 40 |
| C10 | F | 4.00% | 0.49% | 0.00% | 2 |

*Experiment stopped before squeak noise detected.

From the results in Table 1, it can be seen that the copolyetherester resin formulations of the invention (E1, E2, E3, E5 and E6), which contain a polysiloxane at an amount to give a surface Si concentration as measured by EDX of greater than 0.5 wt %, and a polyether wax concentration of greater than 1 wt %, show excellent non-squeak performance.

While certain of the preferred embodiments of the present invention have been described and specifically exemplified above, it is not intended that the invention be limited to such embodiments. Rather, it is to be understood that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

The invention claimed is:

1. A copolyetherester formulation comprising:
   (1) at least one copolyetherester resin; and
   (2) a polysiloxane at an amount that gives a concentration of Si at the surface by Energy Dispersive X-ray spectroscopy of greater than 0.5 wt %; and
   (3) a polyether glycol wax at a concentration of greater than 1 wt %;
   wherein the weight percentages are complementary and based on the total weight of the copolyetherester formulation, wherein the polysiloxane is polydimethylsiloxane (PDMS) encapsulated in poly [methyl (meth) acrylate].

2. The copolyetherester formulation of claim 1, wherein the copolyetherester is selected from those made from the monomers terephthalate, poly (tetramethylene oxide) glycol and butane diol.

3. The copolyetherester formulation of claim 1, wherein the copolyetherester has a number average molecular weight of between 60,000 and 80,000.

4. The copolyetherester formulation of claim 1, wherein the polysiloxane is present in an amount that gives a concentration of Si at the surface as measured by EDX of greater than 0.7 wt %, based on the weight of atoms in the surface layer, based on a surface layer depth of 1.5 microns.

5. The copolyetherester formulation of claim 4, wherein the polysiloxane is present in an amount that gives a concentration of Si at the surface as measured by EDX of greater than 0.9 wt %, based on the weight of atoms in the surface layer, based on a surface layer depth of 1.5 microns.

6. The copolyetherester formulation of claim 1, wherein the PDMS encapsulated in poly [methyl (meth) acrylate] has a number average particle size of between 200 and 300 μm as determined by optical microscopy.

7. The copolyetherester formulation of claim 1, comprising the polyether glycol wax in an amount of from 1 to 4 wt %.

8. The copolyetherester formulation of claim 7, comprising the polyether glycol wax in an amount of 3 wt %.

9. The copolyetherester formulation of claim 1, wherein the polyether glycol wax is selected from polyether glycols having repeat glycol units of 2, 3 or 4 carbon atoms.

10. The copolyetherester formulation of claim 9, wherein the polyether glycol wax is poly (tetramethylene oxide) glycol.

11. The copolyetherester formulation of claim 1, wherein the polyether glycol has a molecular weight of from 800 to 3,000.

12. The copolyetherester formulation of claim 11, wherein the polyether glycol has a molecular weight of about 2,000.

13. A CVJ boot made from the copolyetherester formulation of claim 1.

* * * * *